July 9, 1968  L. C. PURSIANO ETAL  3,392,382
ELECTROMAGNETIC INDICATOR DEVICE HAVING MAGNETIC ROTOR
POSITIONED BY PERIPHERAL ELECTROMAGNETS
Filed April 14, 1965  3 Sheets-Sheet 1

INVENTORS
LEONARD C. PURSIANO
ARNOLD H. COHEN
BY Herbert L. Davis
ATTORNEY

July 9, 1968     L. C. PURSIANO ET AL     3,392,382
ELECTROMAGNETIC INDICATOR DEVICE HAVING MAGNETIC ROTOR
POSITIONED BY PERIPHERAL ELECTROMAGNETS
Filed April 14, 1965     3 Sheets-Sheet 2

INVENTORS
LEONARD C. PURSIANO
ARNOLD H. COHEN

BY Herbert L. Davis

ATTORNEY

July 9, 1968   L. C. PURSIANO ETAL   3,392,382
ELECTROMAGNETIC INDICATOR DEVICE HAVING MAGNETIC ROTOR
POSITIONED BY PERIPHERAL ELECTROMAGNETS
Filed April 14, 1965   3 Sheets-Sheet 3

NUMBER CALL OUT

| SWITCH No. | + ON | − ON |
|---|---|---|
| 1 | A | X |
| 2 | X | D |
| 3 | B | X |
| 4 | X | E |
| 5 | C | X |
| 6 | X | A |
| 7 | D | X |
| 8 | X | B |
| 9 | E | X |
| 0 | X | C |

TABLE A

NUMBER CALL OUT

| LEAD X | E | D | C | B | A | No. |
|---|---|---|---|---|---|---|
| − |   |   |   | + | + | 1 |
| − |   |   |   | + |   | 2 |
| − |   |   | + | + |   | 3 |
| − |   |   |   | + |   | 4 |
| − |   | + | + |   |   | 5 |
| − |   |   | + |   |   | 6 |
| − | + | + |   |   |   | 7 |
| − | + |   |   |   |   | 8 |
| − | + |   |   |   | + | 9 |
| − |   |   |   |   | + | 0 |

TABLE B

FIG. 5

INVENTORS
LEONARD C. PURSIANO
ARNOLD H. COHEN

BY Herbert L. Davis
ATTORNEY

[Col 1]

3,392,382
ELECTROMAGNETIC INDICATOR DEVICE HAVING MAGNETIC ROTOR POSITIONED BY PERIPHERAL ELECTROMAGNETS
Leonard C. Pursiano, Ridgewood, and Arnold H. Cohen, Park Ridge, N.J., assignors to The Bendix Corporation, Teterboro, N.J., a corporation of Delaware
Filed Apr. 14, 1965, Ser. No. 448,084
7 Claims. (Cl. 340—378)

This invention relates to an electromagnetic indicator device and more particularly to improvements in an electromagnetic indicator of a type such as disclosed in U.S. application Ser. No. 392,430, filed Aug. 27, 1964, by Leonard C. Pursiano and Arnold H. Cohen, now U.S. Patent No. 3,311,911, granted March 28, 1967 and U.S. application Ser. No. 380,899, filed July 7, 1964, by Leonard C. Pursiano, Arnold H. Cohen, and George O. Ranes, now U.S. Patent No. 3,350,709, granted Oct. 31, 1967, both of which patents have been assigned to The Bendix Corporation; in U.S. Patent No. 3,089,131, granted May 7, 1963, to William H. Morgan, and also assigned to The Bendix Corporation; and in U.S. Patent No. 3,109,167, granted Oct. 29, 1963, to John R. MacIntyre and Raymond J. Miller, and to an electrically actuated indicator for adjustably positioning any one of a plurality of discrete numbers or symbols on a single rotating drum so as to indicate, for example, any one of ten decimal digits 0–9 or symbols, inclusive, and by electrical pulses selectively applied through six wires by either a direct positive to negative connection, negative to positive connection, or a selectively effected one or two connection of the controlled electromagnets or by an eleven wire system to selectively energize the controlling electromagnets.

In the aforenoted U.S. Patent No. 3,350,709, there is shown a somewhat similar electromagnetic device in which ambiguities in the selection of indicator numbers or symbols displaced 180° may be overcome by magnetizing a permanent magnet rotor in such a manner that the north pole is displaced from the south pole by approximately 165°, i.e. one pole is magnetized in alignment with a center line while the other pole is magnetized approximately 15° off the center line. This novel feature in the arrangement shown in the aforenoted U.S. Patent No. 3,350,709 served to solve the ambiguity problem, but presented certain disadvantages:

(1) The ten numbers or symbols provided on the indicator drum operated by the permanent magnet rotor would not be equally spaced from each other, due to the peculiar arrangement of the poles of the permanent magnet rotor so that, while the scale provided on the indicator drum was uniformly repetitive, it was necessary that the indicator numbers or symbols be arranged in a characteristic pattern of a space between every two numbers provided around the circumference of the indicator drum.

(2) Furthermore, it was found that while the ten indicator numbers or symbols on the indicator drum may be displayed upon the selective energization of the controlling electromagnets, only five of these numbers may be selectively displayed during the deenergized state of the controlling electromagnets. This condition was found to be inherent in the system disclosed by the aforenoted U.S. Patent No. 3,350,709 because of an opposite magnetic detent action of the drum in the display of each of the two adjacent numbers or symbols due to the peculiar arrangement of the permanent magnet rotor.

In the U.S. Patent No. 3,311,911, the two disadvantages listed above may be avoided by the provision of novel phasing windings so arranged that the ten indicator numbers or symbols may be equally spaced from each

[Col 2]

other around the periphery of the indicator drum and in which the magnetic detent action (change in position) effected by the permanent magnet rotor in passing from the excited to the unexcited station of the controlling electromagnet is effected in the same direction at each number or symbol, resulting in ten equally spaced detent positions. Thus, the ten numbers or symbols on the indicator drum may be displayed in either the energized or deenergized state of the controlling electromagnets.

Thus, unlike the indicator described in the U.S. Patent No. 3,350,709 in which the ambiguity problem is solved by means of a permanent magnet rotor in which one pole is magnetized approximately 15° off the center line, in the indicator described in the U.S. Patent No. 3,311,911 the ambiguity problem is solved by means of a novel arrangement of phasing windings so that there may be used a conventional permanent magnet rotor in which the north and south poles are magnetized in alignment along the same axis and in which the magnetic detent action is effected by means of the novel arrangement of additional phasing windings. Thus, in the U.S. Patent No. 3,311,911, the ambiguities in the operation of the indicator drum may be eliminated by means of the novel arrangement of phasing windings, instead of through the provision of the specially magnetized permanent magnet rotor of the aforenoted U.S. Patent No. 3,350,709.

An object of the present invention is to provide an electromagnetic indicator embodying a five-pole electromagnetic assembly including a two-pole permanent magnet rotatably mounted in cooperative relation therewith together with a novel pole piece affixed to the magnet and so arranged in relation thereto and to the five-pole electromagnetic assembly as to eliminate discrepancies in selectively positioning in relation to a viewing window the numbers or indicating symbols borne by a rotatable indicator drum driven by the permanent magnet, in that the permanent magnet is so poled that one pole is magnetized in alignment with the other, while the novel pole piece may be formed of a low magnetic retentivity material mounted on the permanent magnetic rotor but being so constructed and arranged, as shown by FIGURE 1, as to shunt only an insignificant portion of the magnetic field of the rotor, and having a magnetic axis displaced from the magnetic north-south pole axis of the permanent magnet by a small angle of, for example, twenty-five degrees so as to produce in cooperation with the poles of the five-pole electromagnetic assembly a detent action without the need of additional phasing windings, as rquired in the indicator disclosed in the U.S. Patent No. 3,311,911, so as to provide a resultant magnetic field in which is combined the magnetic forces generated by the permanent magnet rotor and the detent action pole piece so as to angularly displace the permanent magnet rotor out of alignment with the dominating coacting pole of the main winding upon energization thereof and thereby prevent ambiguity in the selective positioning of the numbers or indicating symbols borne by the drum.

Another object of the invention is to provide a magnetic indicator having a permanent magnet rotor with opposite poles in alignment one with the other and a low magnetic retentivity pole piece mounted on the permanent magnet rotor in an angularly displaced relation therewith and arranged in cooperative relation with angularly spaced main windings so as to angularly displace the permanent magnet rotor from magnetic alignment with the poles of the main windings upon selective energization of the main windings in order that the permanent magnet rotor may be operably positioned from one adjusted position to a diametrically opposite adjusted position relative to the five-pole electromagnetic assembly by magnetic forces applied to the poles of the permanent magnet without danger of a stalling of the permanent magnet rotor in a dead center position.

Another object of the invention is to provide an improved simplified electromagnetic indicating apparatus including a magnetic rotor member having a simple magnetic pole piece affixed thereto in angular relation and cooperatively arranged in relation to angularly spaced main windings so as to provide a plurality of discrete angularly spaced rotor positions without the need of the relatively complex structure and disadvantages in the mode of operation of the indicator devices shown in the aforenoted applications and patents to prevent ambiguity in effecting the displacement of the rotor.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

Figure 3:
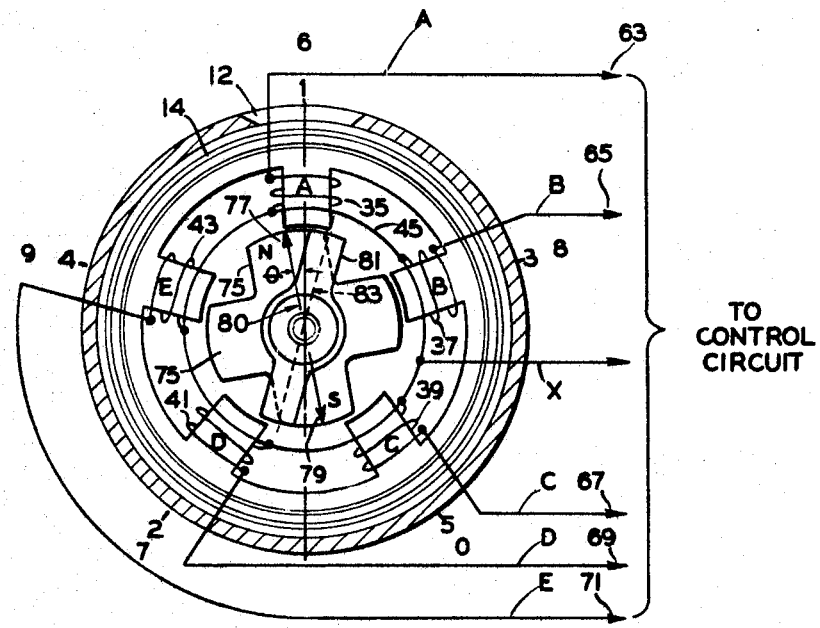
FIGURE 3 is a schematic wiring diagram of the indicator of FIGURE 2 illustrating a six wire circuit arrangement for selectively energizing the field windings for controlling the angular position of the indicator with the rotor of the indicator in a position typical of that effected upon the field winding of the pole A being in an energized state in accordance with Table A of FIGURE 5.
Figure 4:
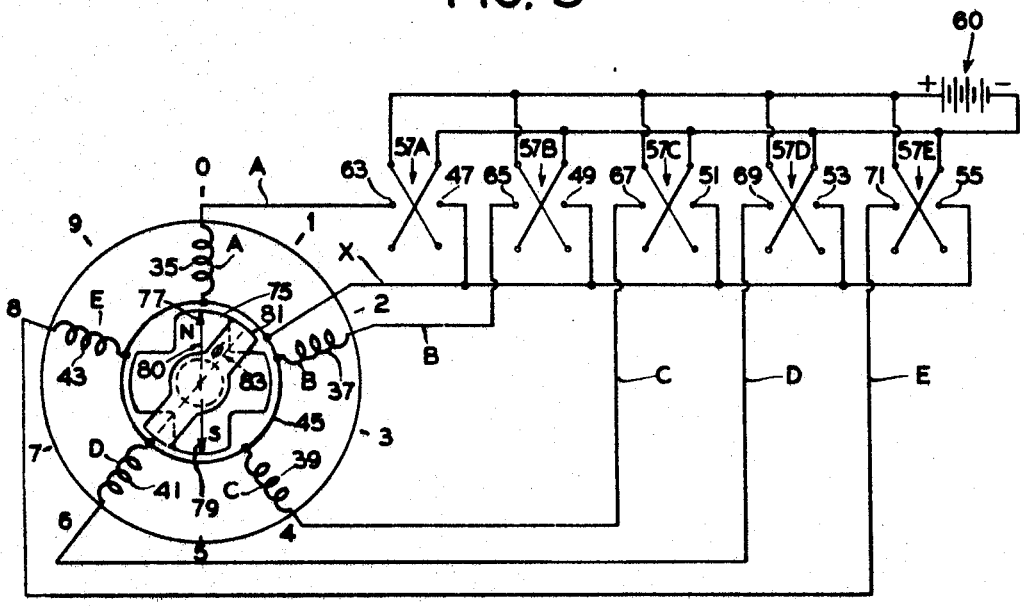
FIGURE 4 is a circuit diagram showing a switching arrangement which may be utilized to selectively energize in accordance with Table B of FIGURE 5 a six wire circuit for controlling the field windings of the electromagnets of the indicator including the improved rotor of the present invention.

FIGURE 5 illustrates Tables A and B in which Table A shows the mode of energization of the controlling electromagnets of the indicator of FIGURE 3 to produce different indications by the provisions of either a + to — connection or a — to + connection, while Table B shows a somewhat different mode of energization of the electromagnets using common polarity excitation and a selective one or two connection of the controlling electromagnets of the indicator of FIGURE 4.

Figure 2:
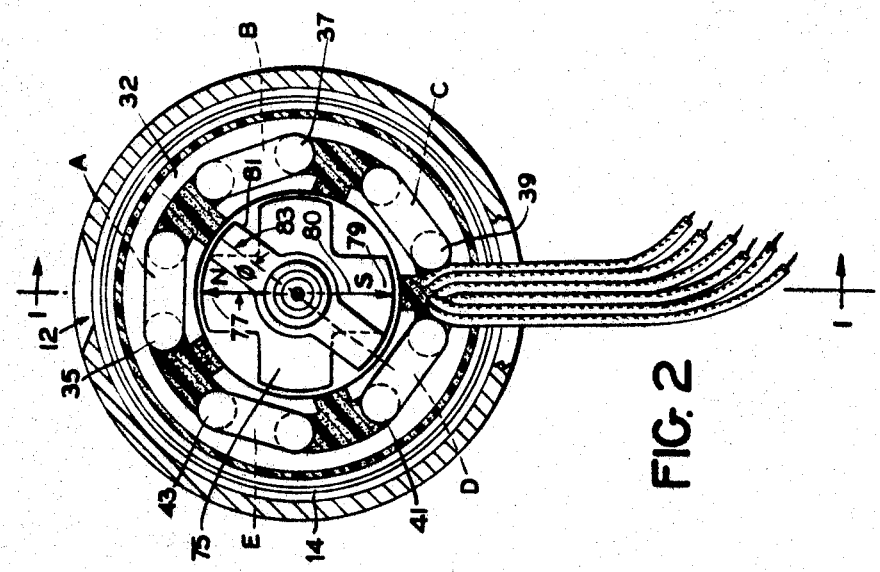
FIGURE 2 is a sectional view of FIGURE 1 taken along the lines 2—2 of FIGURE 1 and looking in the direction of the arrows with the rotor of the indicator in a position typical of that effected upon the field windings being in a deenergized state immediately following deenergization of the field winding of pole A.
Figure 1:
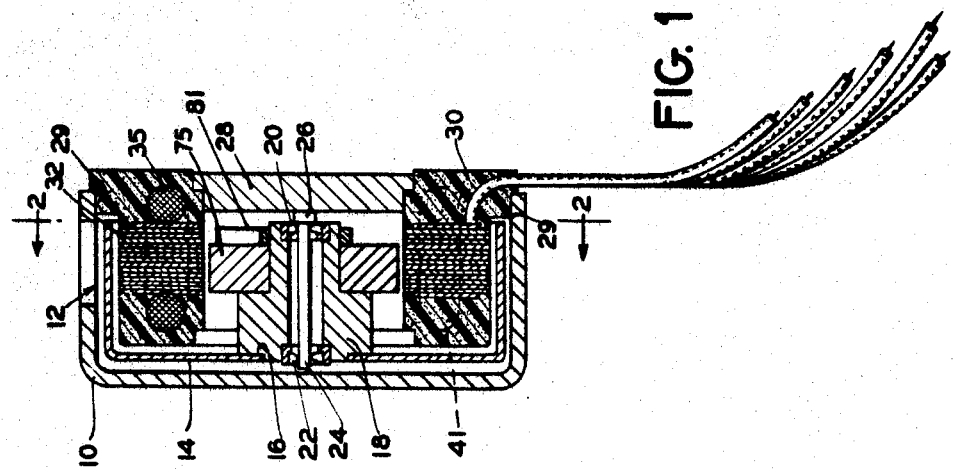
FIGURE 1 is a cross-sectional view of an indicator embodying the invention and taken along the lines 1—1 of FIGURE 2 and looking in the direction of the arrows.

Referring to the drawings of FIGURES 1, 2, and 3, an indicator constructed in accordance with the invention is shown as including a casing 10 of a generally cylindrical configuration, including a window 12 in the side wall thereof through which any one of a plurality of equally spaced numbers or indicator symbols may be viewed on a rotary indicating member or drum 14.

The drum 14 is formed of a light weight nonmagnetic material such as aluminum which is centrally secured at 16 to a mounting sleeve 18 carried by jewel or other suitable bearings 20 and 22 mounted at opposite ends of the sleeve 18 and rotatably supporting the sleeve 18 on a shaft 24 which is secured at one end 26 to an end cap 28 fixedly mounted in a plastic electrical insulating block 30 which is in turn affixed to the casing 10 at an annular flange 29. The plastic electrical insulating material or block 30 may be of a suitable epoxy material and serves to encapsulate within the casing 10 a five-pole stator indicated generally in the drawing of FIGURE 1 by the numeral 32.

Projecting radially inward from the stator 32 are the poles A, B, C, D, and E, shown in FIGURES 2 and 3, and further wound about the respective poles A, B, C, D, and E are main electromagnetic windings or coils 35, 37, 39, 41 and 43, shown structurally in FIGURE 2 and diagrammatically in FIGURE 3.

As shown schematically in FIGURE 3, the inner ends of each of the coils 35, 37, 39, 41, and 43 are connected to a common conductor 45 connected by a conductor X to switch contacts 47, 49, 51, 53, and 55 arranged for cooperation with two-way control switches 57A, 57B, 57C, 57D, and 57E for the electromagnetic control coils 35, 37, 39, 41, and 43 on the poles A, B, C, D, and E, as shown diagrammatically in FIGURE 4, and arranged to selectively connect the positive and negative terminals of a source of electrical energy 60 to effect the desired controlling action, as hereinafter explained.

In this connection, it should be noted that the five poles A, B, C, D, and E are equally angularly spaced about a rotatable permanent magnet 75 having the aligned opposed poles 77 and 79 cooperatively arranged in relation to the electromagnetic poles A, B, C, D, and E. The rotatably permanent magnet 75 is secured to the bearing sleeve 18, as shown in FIGURE 1, and the magnet 75 is so arranged that one pole 77, for example, the north pole, is magnetized in alignment with the opposite pole 79, or south pole, as indicated in FIGURES 2, 3, and 4, so as to provide a magnetic axis 80.

*Improved rotor*

In the present invention the improved rotor structure includes the permanent magnet rotor 75 with the north and south poles in a magnetic axis of alignment 80, instead of the approximate fifteen degrees (15°) offset in rotor magnetization described in the U.S. Patent No. 3,350,709. In addition, in the improved rotor of the present invention, there is provided a bar 81 of soft iron or suitable low magnetic retentivity material having its size in relation to the size of said permanent magnet rotor, as shown by FIGURE 1, and its construction and arrangement such that it shunts only an insignificant portion of the main magnetic field produced by the rotor, and the bar 81 being affixed to the permanent magnet 75 with an axis 83 of the bar 81 displaced from the north and south magnetic axis 80 by a small angle of, for example, approximately twenty-five degrees (25°), as shown in FIGURES 2 and 3, instead of the provision of phasing windings or coils in angular spaced relation to the main windings as described in the U.S. Patent No. 3,311,911.

Operation of the improved indicator of the present invention is similar to that described in the aforenoted U. S. Patent No. 3,311,911 and the U.S. Patent No. 3,350,709, except that the magnetic detent action is achieved in a distinctly different manner by a simpler and improved idea of means in the provision of the improved rotor structure.

Thus, when coil 35 is energized to effect the magnetization of the pole A to call for position 1, a magnetic field is set up in the stator whose magnitude and position is determined by the excitation applied to coil 35 of pole A. The permanent magnet rotor 75, conventionally magnetized with both north and south poles along the same axis 80, together with the soft iron member 81 attached to the permanent magnet 75, will be attracted to the stator pole A excited by coil 35. However, the north-south axis 80 of the permanent magnet 75 will not line up with the center line of pole A because of a magnetic shunting effect of the soft iron member 81 affixed to the permanent magnet 75. Instead, the axis 80 of the magnet 75 will be displaced from the center line of pole A by an amount $\theta$, this detent angle dependent upon the angular position ($\phi$) of the soft iron piece 81 attached to the permanent magnet 75 with respect to the axis 80 of the magnet 75. Thus, position 1 is determined. When the excitation is removed from coil 35 of pole A, the permanent magnet rotor 75 will change position by an amount $\theta$ and the axis of the magnet 75 will line up with the center line of pole A, as shown in FIGURE 2. Magnetic detent is achieved and the rotor will hold its position with power off.

When position 6 is called for, the excitation to coil 35 of pole A is reversed (see Table A of FIGURE 5), and a magnetic field will be created in the stator 180 degrees displaced from said original magnetic field. A turning couple will be developed on the permanent magnet rotor 75, due to magnetic detent action by the member 81 toward pole A, and thus the rotor north pole will line up in a new position θ degrees displaced from the midpoint of poles C and D (see FIGURE 3). At position 6, when the power is removed (see FIGURE 2), the permanent magnet rotor 75 will now rotate clockwise by an angle θ and align itself with the center line of pole A or the midpoint between poles C and D.

If this magnetic detent does not exist, the turning couple in going from position 1 to 6 will be equal in either direction, resulting in an unstable condition and hence no movement. Thus, it can be seen that with 10 detent positions and 10 excited positions, display of information can be maintained in either the energized or deenergized states, and the scale will be uniform with all ten numbers equally spaced from each other around the drum.

The six wire system shown in FIGURE 3 can also be operated from a common polarity source, exciting one coil for some positions and two coils of the same polarity for alternate positions. (See Table B of FIGURE 5.) For example, position 1 (see FIGURE 4) can be obtained by exciting coils 35 and 37 of poles A and B and number 6 can be positioned by energizing coil 41 of pole D with the same polarity. Magnetic detent action is developed in a manner similar to that described for the indicator using alternate polarity excitation.

The arrangement is such then that by the selective operation of the switch arms 57A, 57B, 57C, 57D and 57E by the operator, as indicated in the Table A of FIGURE 5, a direct positive connection of the source of electrical energy 60 to the selected main windings 35, 37, 39, 41, and 43 on the respective angularly spaced poles A, B, C, D, or E, may be effected to call out the indicator number or symbol on the drum 14, as shown at Table A of FIGURE 5 by the electromagnetic positioning of the drum 14 in relation to the indicator viewing window 12, shown in FIGURES 1 and 3. In this latter operation, the combined field generated by the energized main windings and the magnetic shunting effect of the low magnetic retentivity bar or member 81 displaces the pole of the permanent magnet rotor 75 from alignment with the pole of the energized main winding by the angle θ, as shown in dotted lines in FIGURE 3. Upon deenergization of the controlling electromagnet, the permanent magnet 75 lines up with the pole of the controlling electromagnet, as shown by FIGURE 2.

In an alternative mode of operation, a one or two connection of the controlling electromagnetic windings or coils 35, 37, 39, 41, and 43 of the poles A, B, C, D, and E, as indicated in Table B of FIGURE 5 by the indicated positive (+) designation may be effected to provide the desired indication operation of the electromagnets. Alternatively, the common polarity excitation of one or two coils may be all negative if required with the common lead positive.

A feature of the invention is the novel arrangement of the magnetic shunting bar or member 81 on the rotatable permanent magnet 75 having the opposing north and south poles 77 and 79 in alignment one with the other and with shunting bar 81 extending in a fixed angular relation thereto so that the drum 14 affixed to the magnet 75 through the mounting sleeve 18 may be angularly displaced in relation to the pole of the corresponding main winding upon energization thereof and positioned to all points without ambiguity in the operation thereof.

The improved rotor structure of the present invention is equally applicable to such an electromagnetic indicator device having an eleven wire control system such as described in the U.S. Patent No. 3,311,911, for selectively effecting energization of the main control windings 35, 37, 39, 41, and 43 wound on the poles A, B, C, D, and E, respectively, together with separate main windings wound on the poles A, B, C, D, and E, respectively, in the reverse direction from the windings 35, 37, 39, 41, and 43.

The selective operation of such a switch mechanism will then control the energization of the several windings on the poles A, B, C, D, and E from a source of electrical energy 60 so as to effect the desired operation in much the same manner as the indicator device heretofore described with reference to FIGURES 2 and 3 except that the polarity applied to the respective windings is not reversed, but is effected by reversely wound windings thereon selectively energized through an eleven wire control system, as described in the aforenoted U.S. Patent No. 3,311,911.

Operation of the eleven wire system with common polarity excitation can best be described by comparing it to the operation of the six wire system with alternate excitation. (Compare FIGURE 4 with FIGURE 2 and FIGURE 3.) Both the six and the eleven wire system incorporate five poles, but the eleven wire system uses two coils per pole rather than one. One of the coils per pole produces a stator field of a particular magnitude and direction, while the other coil on the same pole is wired in such a manner so as to produce an equivalent stator field 180 degrees displaced from the other when excited from the same common polarity source. Thus, position 1 can be obtained by exciting coil 35 on pole A, whereas position 6 can be obtained by exciting a reversely wound coil on the same pole A using common polarity excitation. Magnetic detent is produced using the magnetic shunt bar or member 81 in the same manner as produced in the six wire system with alternate polarity excitation, as shown by Table A of FIGURE 5.

*Operation*

In the operation of the indicator device of the present invention, when the main coil 35 is energized to call out position 1, a magnetic field is set up in the stator aligned with the center line of the electromagnetic core A. The rotor is offset by an angle θ in a counterclockwise direction due to the shunting effect of member 81 which is providing a path for the stator flux between electromagnetic cores A and D, thus positioning the drum 14 controlled by the permanent magnet 75 so as to actuate the indicator drum 14 to an adjusted position, as shown by FIGURE 3, to present the numeral 1 or symbol borne thereby to view through the window 12, as shown in FIGURE 1.

When the excitation of the main coil 35 is removed, the permanent magnet rotor 75 will change position in a clockwise direction by the amount of the angle θ so as to line up with the center line of the pole A, as shown by FIGURE 2. Thus, a magnetic detent action is achieved and the rotor will hold its position with the power off.

When the indicator numeral 6 is called for, the excitation of the main coil 35 on the pole A is reversed, as shown by Table A of FIGURE 5, so that a magnetic field will then be created in the stator 32 which is again along the center line of electromagnetic core A, but of an opposite polarity from that providing for display of the numeral 1. This configuration of rotor 75 and said magnetic field alone would cause a state of unstable equilibrium. The shunt member 80, however, providing a path for stator flux between electromagnetic cores A and D will cause a slight counterclockwise rotation from the position shown by FIGURE 2 in an attempt to reach a stable stator flux configuration. Said counterclockwise rotation results in a sufficient rotor offset so that said rotor member 75 may now revolve 180 degrees in a counterclockwise direction aligning itself along its north-south pole axis with the center line of electromagnetic core A and the midpoint between electromagnetic cores C and D. Again, shunt member 81, in attempting to provide a stable stator flux configuration between electromagnetic cores A and D, will cause a further counterclockwise displacement, θ, of said rotor member 75, as shown by FIGURE 3, with the north and south poles 77 and 79 now reversed.

At position 6, when the power is removed, the permanent magnet rotor 75 by the magnetic detent action thereof will now be rotated in a clockwise direction through the angle θ and align itself with the center line of pole A or the midpoint of the center line between the poles C and D.

If this magnetic detent action of the shunting member 81 was not provided, the turning couple in going from position 1 to 6 would be equal in either direction resulting in an unstable equilibrium condition and hence no movement. Thus, it will be seen that, in the present invention, with the magnetic detent positions provided, the display of information may be maintained in either the energized or deenergized state and the ten indicator numbers provided on the drum 14 may be equally spaced from each other around the drum.

The six wire system, shown in FIGURE 3, can also be operated from a common polarity source, exciting one coil for some positions and two coils of the same polarity for alternate positions. For example, position 1 may be obtained by exciting main coil 35 and position 6 may be positioned by energizing both main coils 39 and 41 with the same polarity. A magnetic detent action is developed in a manner similar to that described for the indicator using alternate polarity excitation.

Operation of an eleven wire system with common polarity excitation, as explained in U.S. Patent No. 3,311,911, may be effected with the improved rotor of the present invention in a manner similar to the operation thereof in the six wire system with alternating excitation, as shown in FIGURE 3.

Both the six wire system of FIGURE 3 and the eleven wire system may incorporate five poles, but the eleven wire system may provide two main coils per pole rather than one. One of the main coils per pole produces a stator field of a particular magnitude and direction, while the other main coil on the same pole may be wired in such a manner as to produce an equivalent stator field displaced one hundred and eighty degrees from the other when excited from the same common polarity source.

Thus, position 1 can be obtained by exciting the main coil 35 on pole A, whereas the position 6 may be obtained by exciting an oppositely wound main coil on pole A with the same polarity by using common polarity excitation. A magnetic detent action is produced by the use of the permanent magnet rotor 75 with the shunting member 81 mounted in a fixed angular relation thereto in the same manner as produced by the permanent magnet rotor 75 and shunting member 81 in the six wire system of FIGURE 3 with alternate polarity excitation.

While several embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In an electromagnetic indicator device for displaying a plurality of discrete indicia in response to electrical energization, said indicator device being of a type including a permanent magnet rotor supported for deflection about an axis of rotation thereof to a plurality of discrete angularly spaced positions, at least one main electromagnetic coil, and the main coil being mounted at one side of said axis of rotation with an axis of the coil extending radially in a direction substantially perpendicular to the axis of rotation of said rotor; the improvement comprising a magnetic shunting member mounted on said permanent magnet rotor and having an axis extending in an angular relation to a magnetic axis of said rotor of less than ninety degrees so that upon selective energization of said main coil with electrical signals of either of two opposed polarities angular movement of said permanent magnet rotor about the axis of rotation thereof may be effected from a first position to a second position, said magnetic shunting member providing a path for magnetic flux resulting from energization of the main coil, thereby producing a turning moment so as to prevent a condition of unstable equilibrium in said rotor when it is desired to angularly position the rotor one hundred and eighty degrees, and the direction of angular movement of said permanent magnet rotor about the axis of rotation thereof being in a sense predetermined by the angular relation of the axis of said magnetic shunting member to the magnetic axis of said rotor of less than ninety degrees.

2. In an electromagnetic indicator device for displaying a plurality of discrete indicia in response to electrical energization, said indicator device being of a type including a permanent magnet rotor supported for deflection about an axis of rotation thereof to a plurality of discrete angular spaced positions, a plurality of main electromagnetic coils, the main coils being positioned around magnetic cores equally angularly spaced about said rotor axis and extending radially in a direction substantialy perpendicular to the axis of rotation of said rotor; the improvement comprising a bar of low magnetic retentivity material mounted on said permanent magnet rotor and extending radially at one side thereof and in angular relation to the permanent magnet rotor, said bar providing a path for magnetic flux caused by energization of the main coil, thereby producing a turning moment so as to prevent a condition of unstable equilibrium in said rotor when it is desired to angularly position the rotor to a diametrically opposite position, means to selectively energize said main coils with an electrical signal, said permanent magnet rotor being deflected to an angular position in accordance with a magnetic field generated by the energized main coil and in an angular direction dependent upon the angular position of the bar of low magnetic retentivity material in relation to the permanent magnet rotor.

3. In an electromagnetic indicator device for displaying a plurality of discrete indicia in response to electrical energization, said indicator device being of a type including a permanent magnet rotor having opposite aligned poles and rotatably supported for deflection about an axis of rotation thereof to a plurality of discrete angularly spaced positions, a plurality of electromagnetic main coils, the main coils being positioned about the axis of rotation of said rotor and around equally angularly spaced magnetic cores extending radially in a direction substantially perpendicular to the axis of rotation of said rotor, and a plurality of electrical circuits to selectively energize said coils; the combination comprising a shunting bar of low magnetic retentivity material mounted on said permanent magnet rotor and extending radially in an acute angular relation to an axis of alignment of the opposite poles of the permanent magnet rotor, said shunting bar for providing a path for magnetic flux effected upon energization of said main coil, thereby producing a turning moment so as to prevent a condition of unstable equilibrium in said rotor when it is desired to revolve the rotor one hundred and eighty degrees, and said magnetic rotor being deflected to an angular position in accordance with the selectively energized main coil and the polarity of such energization and in an angular sense dependent upon the relation of the shunting bar to the permanent magnet rotor and the selectively energized main coil.

4. In an electromagnetic indicator device for displaying ten discrete indicia in response to electrical energization, said indicator device being of a type including a casing having a viewing window therethrough, a rotary indicating member positioned within said casing and movable on an axis of rotation through ten discrete positions to display any of said ten different indicia through said window; a rotatably permanent magnet drivingly connected to said rotary member and having opposite poles in an axis of alignment, five main electromagnetic coils, the main coils being positioned about said rotary member and around equally angularly spaced magnetic cores extending radially in a direction substantialy perpendicular to the axis of rotation of said rotary member; the improvement comprising a magnetic shunting bar affixed to said rotary member and extending in an acute angular relation to the axis of alignment of the opposite poles of said permanent magnet so that said permanent magnet may rest in an off-center position with respect to the magnetic core of a selectively energized main coil, and said permanent magnet being magnetically reset into alignment with the magnetic core of said main coil under the magnetic force of said permanent magnet and immediately following the selective deenergization of the last mentioned main coil so as to condition the permanent magnet to be angularly actuated about the axis of rotation thereof in response to the selective energization of other of said main coils and in an angular sense dependent upon the angular relation of the magnetic shunting bar to the permanent magnet rotor and to the selectively energized other of said main coils.

5. In an electromagnetic indicator device for displaying ten discrete indicia in response to electrical energization, said indicator device being of a type including a casing having a viewing window therethrough, a rotary indicating member positioned within said casing and movable on an axis of rotation through ten discrete positions to display any of said ten different indicia through said window; a rotatable permanent magnet drivingly connected to said indicating member and having opposite poles in an axis of alignment, main coils positioned about said indicating member and around equally angularly spaced magnetic cores extending radially in a direction substantially perpendicular to the axis of rotation of said indicating member; the improvement comprising a magnetic shunt including a bar of a low magnetic retentivity material mounted on said rotary indicating member and having a magnetic axis extending radially in an acute angular relation to the axis of alignment of the opposite poles of said permanent magnet and substantially perpendicular to the axis of rotation of said indicating member, said permanent magnet being actuated to an off-center position out of alignment with respect to the magnetic core of one of said main coils upon the selective energization of said one main coil, and said permanent magnet being magnetically reset into alignment with the magnetic core of said one main coil upon the selective deenergization of said one main coil so as to condition the permanent magnet to be angularly actuated about the axis of rotation of the indicating member in response to the selective energization of other of said main coils and in an angular sense dependent upon the angular relation of the magnetic axis of said bar to the axis of alignment of the opposite poles of the permanent magnet and the angular relation of the bar and permanent magnet to the selectively energized other main coils.

6. Electromagnetic indicating apparatus for displaying a plurality of discrete indicia in response to electrical energization comprising a magnetic rotor having diametrically opposed poles rotatably supported for deflection about an axis of rotation thereof to a plurality of discrete angularly spaced positions, a plurality of electromagnetic coils, each of the coils being wound on a magnetic core and positioned about the axis of rotation of the magnetic rotor, the magnetic cores of said coils having axes extending radially in a direction substantially perpendicular to the axis of rotation of said rotor, a magnetic shunt member carried by said rotor and extending radially in a direction substantially perpendicular to the axis of rotation of said rotor, the diametrically opposed poles of the magnetic rotor extending along a line at an acute angular relation to the radially extending shunt member, said magnetic rotor being deflected to a first discrete angular position in accordance with electromagnetic forces effected by selective energization of said coils and a modifying action of the magnetic shunt member, said magnetic rotor upon the selective deenergization of said coils assuming a second discrete angular position adjacent to the first angular position, the second angular position of said magnetic rotor being effected under magnetic forces of the magnetic rotor, the diametrically opposed poles of the magnetic rotor in said second position extending along a line at an acute angular relation to a line along which said opposed poles extend in said first position of the magnetic rotor, the magnetic rotor in said second position being thereupon in a condition to be angularly actuated about the axis of rotation thereof in response to electromagnetic forces effected by selective energization of other of said main coils, and the magnetic rotor being thereupon directly actuatable by the last mentioned electromagnetic forces to a third position diametrically opposite from that of said first position and in an angular sense dependent upon the acute angular relation of the radially extending magnetic shunt member to the diametrically opposed poles of the magnetic rotor.

7. Electromagnetic indicating apparatus for displaying a plurality of discrete indicia in response to electrical energization comprising a magetic rotor having diametrically opposed poles rotatably supported for deflection about an axis of rotation thereof to a plurality of discrete angularly spaced positions, a plurality of electromagnetic coils, each of the coils being wound on a magnetic core and positioned about the axis of rotation of the magnetic rotor, the magnetic cores of said coils having axes extending radially in a direction substantially perpendicular to the axis of rotation of said rotor, a magnetic shunt member carried by said rotor and extending radially in a direction substantailly perpendicular to the axis of rotation of said rotor, the diametrically opposed poles of the magnetic rotor extending along a line at an acute angular relation to the radially extending shunt member, means to selectively energize and deenergize said coils, said magnetic rotor being deflected to a first discrete angular position in accordance with the position of a selectively energized coil, the line along which extend the diametrically opposed poles of the magnetic rotor being thereupon positioned at an acute angular relation to the axis of the magnetic core of the last mentioned coil under the electromagnetic force of the energized coil on the magnetic rotor and modifying action of the magnetic shunt member, and the magnetic rotor upon a selective deenergization of said last mentioned coil assuming a discrete angular position adjacent to the first angular position under magnetic force of said rotor with the diametrically opposed poles of the magnetic rotor thereupon extending along a line in alignment with the axis of the magnetic core of the previously energized coil, whereby each coil, associated magnetic core, magnetic rotor and magnetic shunt member coact to provide two adjacent positions for said rotor.

References Cited
UNITED STATES PATENTS

| | | | |
|---|---|---|---|
| 2,250,395 | 7/1941 | Russell | 310—164 |
| 2,444,164 | 6/1948 | Kohlhagen | 310—164 |
| 3,109,167 | 10/1963 | MacIntyre et al. | 340—325 |

JOHN W. CALDWELL, *Primary Examiner.*

NEIL C. READ, *Examiner.*

I. J. LEVIN, H. I. PITTS, *Assistant Examiners.*